United States Patent
Breeden et al.

(10) Patent No.: US 7,620,977 B2
(45) Date of Patent: Nov. 17, 2009

(54) SYSTEM AND METHOD FOR IMPROVED MANAGING OF PROFILES IN A WEB PORTAL ENVIRONMENT

(75) Inventors: Timothy Breeden, Boulder, CO (US); Skip Sauls, Longmont, CO (US); Christopher Jolley, Broomfield, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 938 days.

(21) Appl. No.: 11/133,571

(22) Filed: May 20, 2005

(65) Prior Publication Data

US 2005/0273717 A1    Dec. 8, 2005

Related U.S. Application Data

(60) Provisional application No. 60/573,776, filed on May 21, 2004.

(51) Int. Cl.
*G06F 21/00*    (2006.01)
*H04L 9/32*    (2006.01)
*G06F 15/16*    (2006.01)

(52) U.S. Cl. .................. 726/5; 726/1; 726/19
(58) Field of Classification Search ........ None
See application file for complete search history.

(56) References Cited

U.S. PATENT DOCUMENTS

| | | | |
|---|---|---|---|
| 6,000,033 A * | 12/1999 | Kelley et al. | 726/8 |
| 7,197,765 B2 * | 3/2007 | Chan et al. | 726/8 |
| 7,251,732 B2 * | 7/2007 | Jamieson et al. | 713/182 |
| 7,260,838 B2 * | 8/2007 | Bones et al. | 726/8 |
| 7,275,259 B2 * | 9/2007 | Jamieson et al. | 726/8 |
| 7,392,536 B2 * | 6/2008 | Jamieson et al. | 726/8 |
| 7,475,146 B2 * | 1/2009 | Bazot et al. | 709/227 |
| 7,496,953 B2 * | 2/2009 | Andreev et al. | 726/8 |
| 2003/0195970 A1 * | 10/2003 | Dinh et al. | 709/229 |
| 2004/0250118 A1 * | 12/2004 | Andreev et al. | 713/201 |

* cited by examiner

*Primary Examiner*—Christopher A Revak
(74) *Attorney, Agent, or Firm*—Fliesler Meyer LLP

(57) ABSTRACT

There are provided mechanisms and methods for mapping information from disparate data sources into a single user profile. Embodiments can provide the capability to work with profiles for users as well as for other entities. These external data sources can include, without limitation: relational databases, file system and Java classes, Enterprise Java Beans (EJBs), Lightweight Directory Access Protocol (LDAP) servers and other network accessible sources. These mechanisms and methods can enable creating a single user profile from attributes residing in disparate data stores. The ability of embodiments to provide mechanisms and methods for creating a single user profile from attributes residing in disparate data stores can enable easier configuration of profiles, without requiring users to write code to perform the mapping.

23 Claims, 5 Drawing Sheets

SYSTEM AND METHOD FOR IMPROVED MANAGING OF PROFILES IN A WEB PORTAL ENVIRONMENT

CLAIM OF PRIORITY

The present application claims the benefit of:
U.S. Provisional Patent Application No. 60/573,776 entitled SYSTEMS AND METHODS FOR PORTAL 9.0, by Skip Sauls et al., filed on May 21, 2004. The entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to provision of content to users on the web. More specifically, it relates to techniques for managing profiles in a web portal environment.

BACKGROUND OF THE INVENTION

Since its inception in 1995, the Java™ programming language has become increasingly popular. (Java™ is a trademark of Sun Microsystems, Inc.) Java, which is an interpreted language, enabled the creation of applications which could be run on a wide variety of platforms. This ability to function across a variety of different client platforms, i.e., platform independence, and Java's relatively easy implementation of network applications has resulted in the use of Java, as well as other programming languages that provide platform independence, in endeavors as basic as personal web pages to endeavors as complex as large business-to-business enterprise systems.

However, since applications that are designed to provide functionality over networked systems are necessarily designed to rely upon authentication of users, machines, applications or other computational entities in order for the applications to function, such applications are often rendered useless when profile information for these entities used in performing these authentications are unreliable. For example, many applications require a user to authenticate with a remote server. Such applications often wait until such authentication is complete even though the user may have authenticated with another related application previously. Additionally, since each application is separate, the user's profile information, i.e., userid, password, or the like, may be different for each authentication, providing further difficulty in sharing trust between applications.

What is needed is an improved mechanism for managing profiles.

DETAILED DESCRIPTION

In accordance with embodiments, there are provided mechanisms and methods for mapping information from disparate data sources into a single profile. Embodiments can provide the capability to work with profiles for users, applications, machines, proxies, as well as for other entities. These external data sources can include, without limitation: relational databases, file system and Java classes, Enterprise Java Beans (EJBs), Lightweight Directory Access Protocol (LDAP) servers and other network accessible sources. These mechanisms and methods can enable creating a single profile from attributes residing in disparate data stores. The ability of embodiments to provide mechanisms and methods for creating a single profile from attributes residing in disparate data stores can enable easier configuration of profiles, without requiring writing of additional code to perform the mapping.

In an embodiment, a method for managing a profile is provided. The method includes receiving a set of one or more data sources, each data source providing data associated with one or more data fields. A selection of at least one from one or more profile fields and at least one from the one or more data fields is received. The at least one profile field is associated with the at least one data field such that data provided by the data source associated with the at least one data field is utilized for the at least one profile field.

Figure 1:
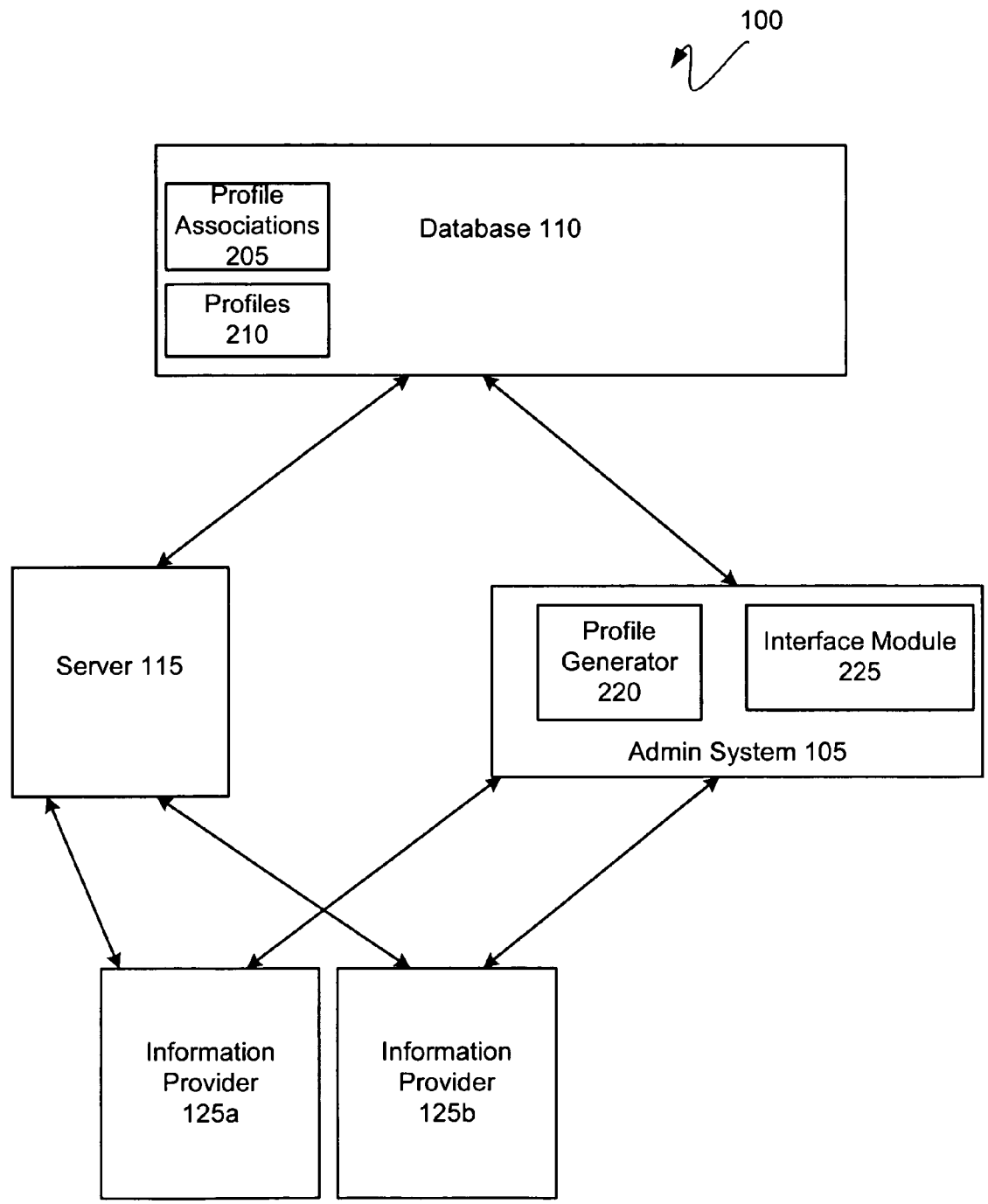
FIG. 1 is functional block diagram of an example computing environment in which techniques for portal creation and administration in an embodiment may be implemented.

FIG. 1 is functional block diagram of an example computing environment in which techniques for portal creation and administration in an embodiment may be implemented. As shown in FIG. 1, a computing environment 100 includes a server 115 that manages access between one or more databases 110 and one or more information providers 125*a*, 125*b*. The server 115 may be accessible to one or more clients (not shown in FIG. 1 for clarity). The server 115 may run Java or other programming language environment configured to provide access to resources internal to the server, as well as resources reachable by the server 115, such as the databases 110. Embodiments of server 115 can be configured from a variety of hardware and software products. In one embodiment, the server 115 utilizes WebLogic® Server from BEA systems of San Jose, Calif. The server 115 may include an internal data store to store data for use by the server 115 in its interaction with the information providers 125*a*, 125*b*.

The databases 110 comprise information resources that are accessed and utilized by the server 115. In one embodiment, the databases 110 are Structured Query Language (SQL) compliant databases. Databases 110 may comprise one or more profiles 210 and profile associations 205 persisted therein. Profiles 210 include information from a plurality of sources external to the database 110 mapped to fields within the profile 210 by one or more profile associations 205, which may be configured by an administrator or other user using techniques described below with reference to FIGS. 3-4. In an embodiment in which the profiles 210 are user profiles, authentication information specific to the user, i.e., userid, password, passphrase, digital signature, security certificates or the like, may be associated with fields in the profile.

The information providers 125a, 125b provide information of various types. Information providers 125a, 125b may be any number or kind of information providers, public or private, including without limitation relational databases, file system and Java classes, Enterprise Java Beans (EJBs), Lightweight Directory Access Protocol (LDAP) servers and other network accessible sources. As with the server 115, information providers 125a, 125b can be implemented by various combinations of hardware and software in various embodiments.

An administration system 105 includes tools for creating profiles, i.e., a profile generator 220, and updating profiles, i.e., an interface module 225. Using the tools provided by administration system 105, an administrator or other user can configure profiles 210 by creating profile associations 205 with information provided by information providers 125a, 125b. The profiles 210 and associations 205 may be persisted in database 110 or elsewhere in the computing environment 100.

While the present invention is described with reference to an embodiment in which user profiles are created and updated from information from disparate external sources, the present invention is not limited to user profiles and may be practiced in conjunction with other types of profiles and information to provide dynamically updated profiles based upon information from disparate external sources for use in web portals and other applications. As used herein, the term "user" is intended to include human users, as well as proxies and other computational entities.

Figure 2:
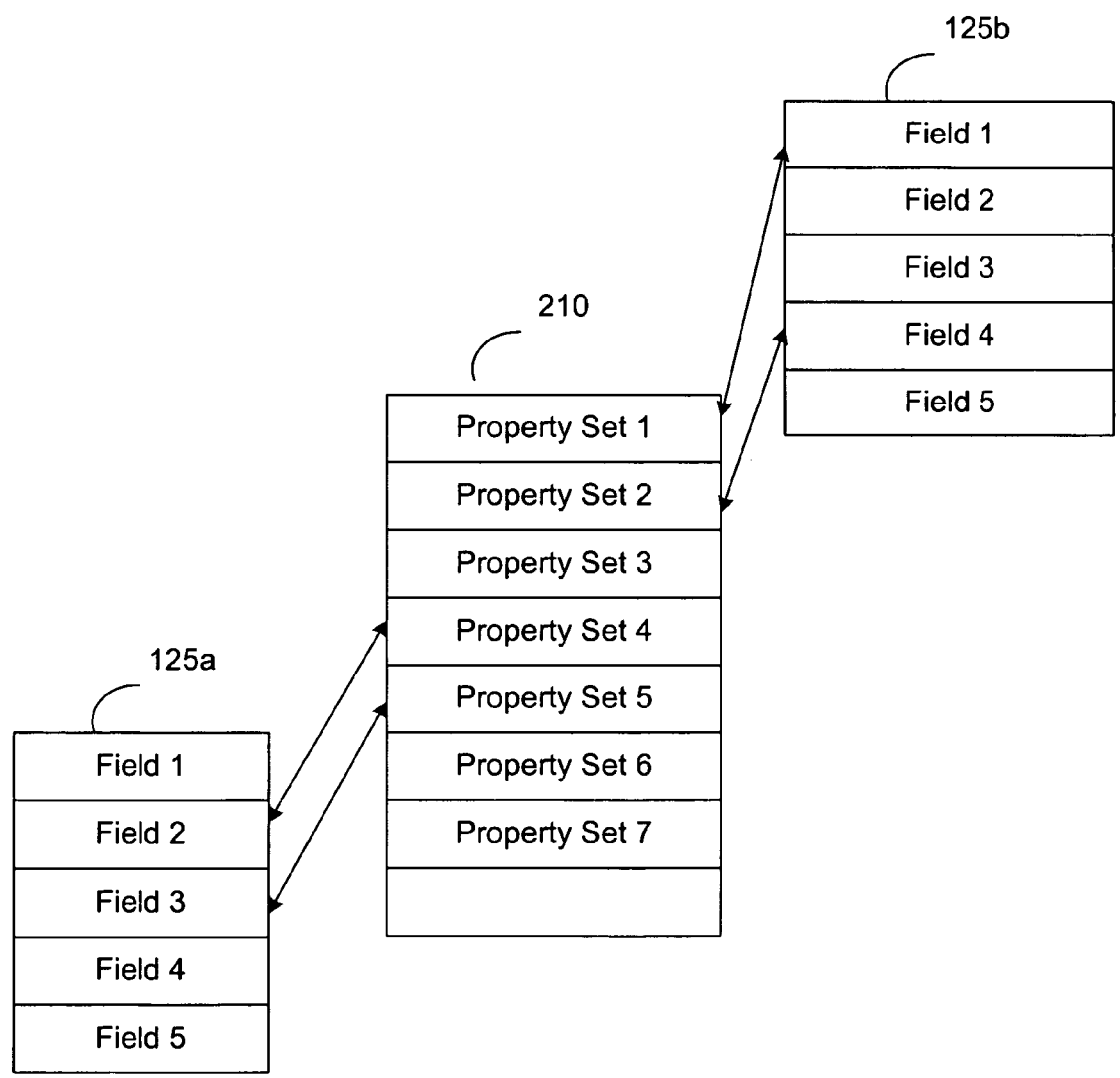
FIG. 2 is a schematic diagram of information from disparate sources being mapped to properties in a profile in an embodiment.

FIG. 2 is a schematic diagram of information from disparate sources being mapped to properties in a profile in an embodiment. As shown in FIG. 2, one or more fields from information providers 125a, 125b may be mapped to one or more property sets in profile 210 by one or more profile associations 205 (arrows). The associations 205 may be persisted in database 110, for example. Applications (not shown) having access to the profile 210 can access the associations 205 to obtain data about a user, for example, from the information providers 125a, 125b. Accordingly, embodiments can enable users to be authenticated with multiple applications that share trusted relationships without the need for the user to re-authenticate with each application.

Figure 3:
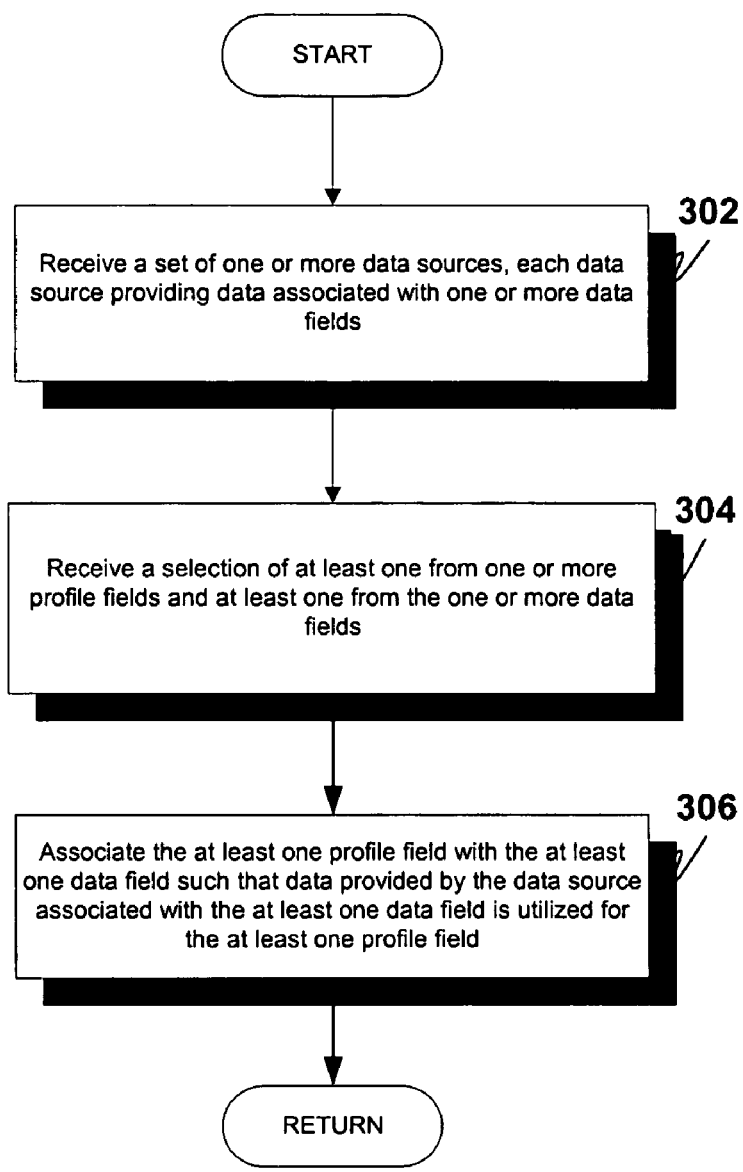
FIG. 3 is a flowchart of example processing for mapping information from disparate sources to properties in a profile in an embodiment.

FIG. 3 is a flowchart of example processing for mapping information from disparate sources to properties in a profile in an embodiment. The technique for mapping information from disparate sources to properties in a profile shown in FIG. 3 is operable with an profile mapping tool, such as embodied by administration system 105 of FIG. 1, for example. As shown in FIG. 3, a set of one or more data sources is received (block 302). Each data source provides data associated with one or more data fields. A selection of at least one from one or more profile fields and at least one from the one or more data fields is received (block 304). The at least one profile field is associated (block 306) with the at least one data field such that data provided by the data source associated with the at least one data field is utilized for the at least one profile field. This method can enable creating a single profile from attributes residing in disparate data stores.

Figure 4:
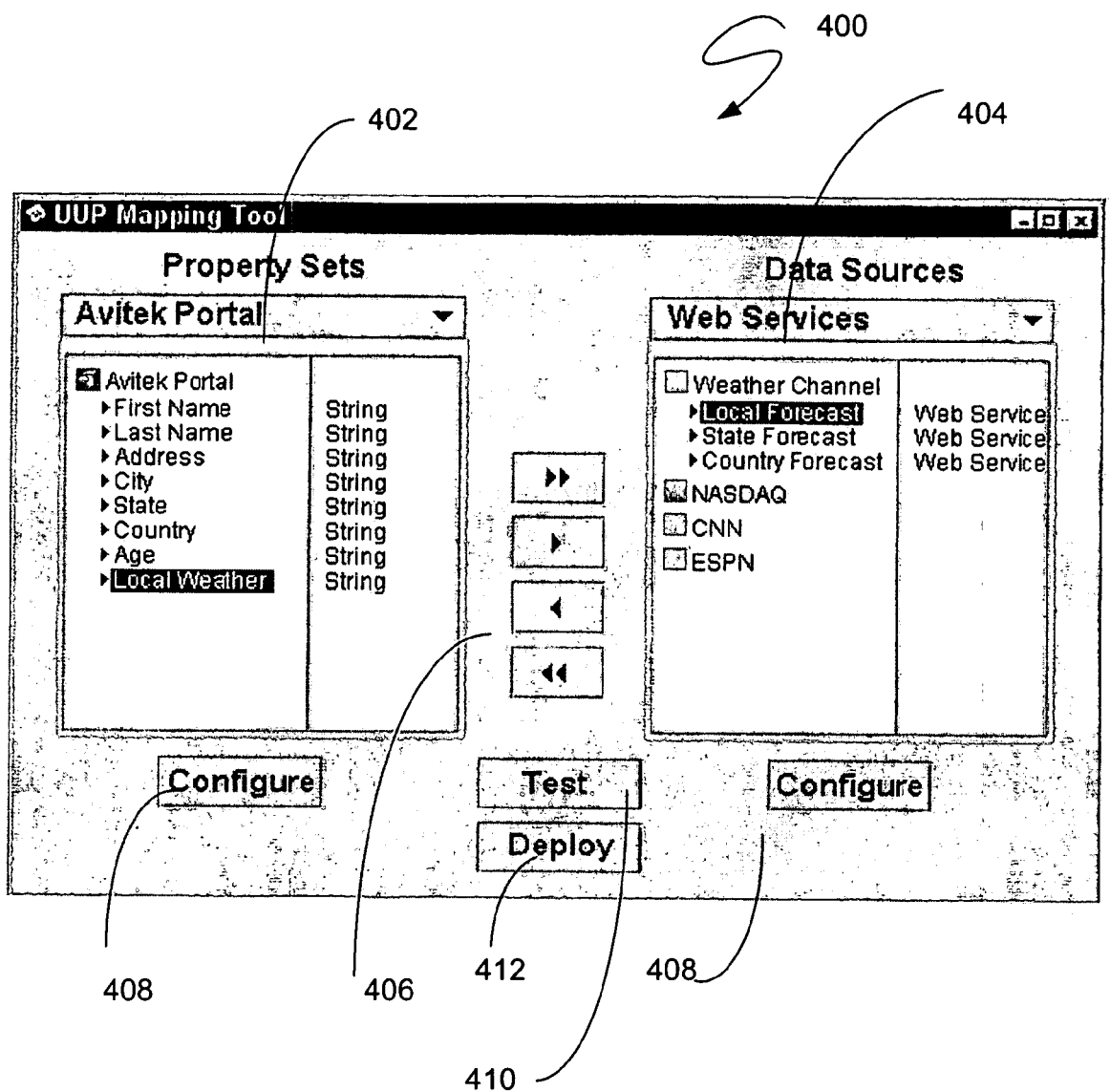
FIG. 4 is a screen shot of an example user interface for configuring mappings of information to property sets in an embodiment.

FIG. 4 is a screen shot of an example user interface for configuring mappings of information to property sets in an embodiment. A user interface screen 400 shown in FIG. 4, provides an administrator or other user with the capability to make associations between property sets in a profile and information sources.

The administrator or other user selects the property set to add new properties to, with the selection being made from a drop-down list 402 in the user interface screen 400. The administrator then selects from the available data sources 404, also in a drop-down list. The lists of property sets and data sources are produced by server 115 and would be accessed via a short-term connection such as HTTP, for example.

The administrator then selects one of the available data sources, which may need to be configured depending on the current state. Configuration of the data source could be performed at various levels depending upon specifics of the embodiment implemented. For example, connection, table, and fields may be configured in the case of an RDBMS. The selected data source is added to the selected property set using the buttons 406 provided. Configuration of the new property includes setting the name, type, and various relevant parameters and is initiated using button 408. For example, a web service based property may need to have a number of parameters to ensure that the proper relevant data is retrieved.

In various implementations, one or more of the following areas may need to be considered for configuration, including without limitation:

Connection parameters such as URL, user ID, password, etc.

Data access parameters such as symbol name, location, encryption etc.

Data type conversion for standard types.

Optional Java classes for complex type conversions.

User-defined queries for RDBMS access, etc.

Caching options for local caching to default schema, including TTL, read vs. read/write, etc.

Once the new data source is mapped and configured, the administrator can test the new property with a simple dialog initiated by clicking the test button 410. The administrator could choose a user, supplying a password if necessary, and the test configuration would be deployed to the server in a test mode. After deployment a connection with the server 115 could be established or a browser could be spawned from a generated URL. In either case the administrator is presented with a simple sets of controls for testing the creation, setting, getting, and deletion of the new property for the selected user.

After testing and when satisfied with the new configuration, the administrator can choose to create the property and deploy it by clicking button 412. If the property has been tested and is unchanged, the server would be notified to make the test property permanent. If it has not been tested, it would be generated and deployed. At this point it would be available for use by the server as well as other users.

In an embodiment, the generation step will result in an extensible Markup Language (XML) descriptor that contains the necessary information for accessing the external data source. This will vary depending on the type of external data source, therefore embodiments are not be limited to a single set of data source types. An embodiment queries the server 115 to get the list of available data sources and types, along with the associated schemas for generation. Configuration of these data sources would also vary depending on the schemas.

Deployment of the descriptor to a server comprises steps being taken to update the associated server-side components. These components are dynamic and use the descriptors to create the relevant queries, to the external data sources. If caching is used, this would also result in the creation of entries in standard property set schemas for each of the properties to be cached.

In some embodiments, the server-side components and tools are extensible and/or pluggable to enable third parties to provide generators and adaptors. For example, a systems integrator might create a custom generator and adaptor that accesses data from Tuxedo® (which stands for Transactions for Unix, Enhanced for distributed Operation) or Common Object Request Broker Architecture and Component Object Request Broker Architecture (CORBA). (Tuxedo® is a registered trademark of BEA Systems Inc. of San Jose, Calif.). Similarly, another party might create a custom generator and adaptor that produces descriptors from analytics operations and access data from external analytics tables.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for managing profiles as discussed herein.

Figure 5:
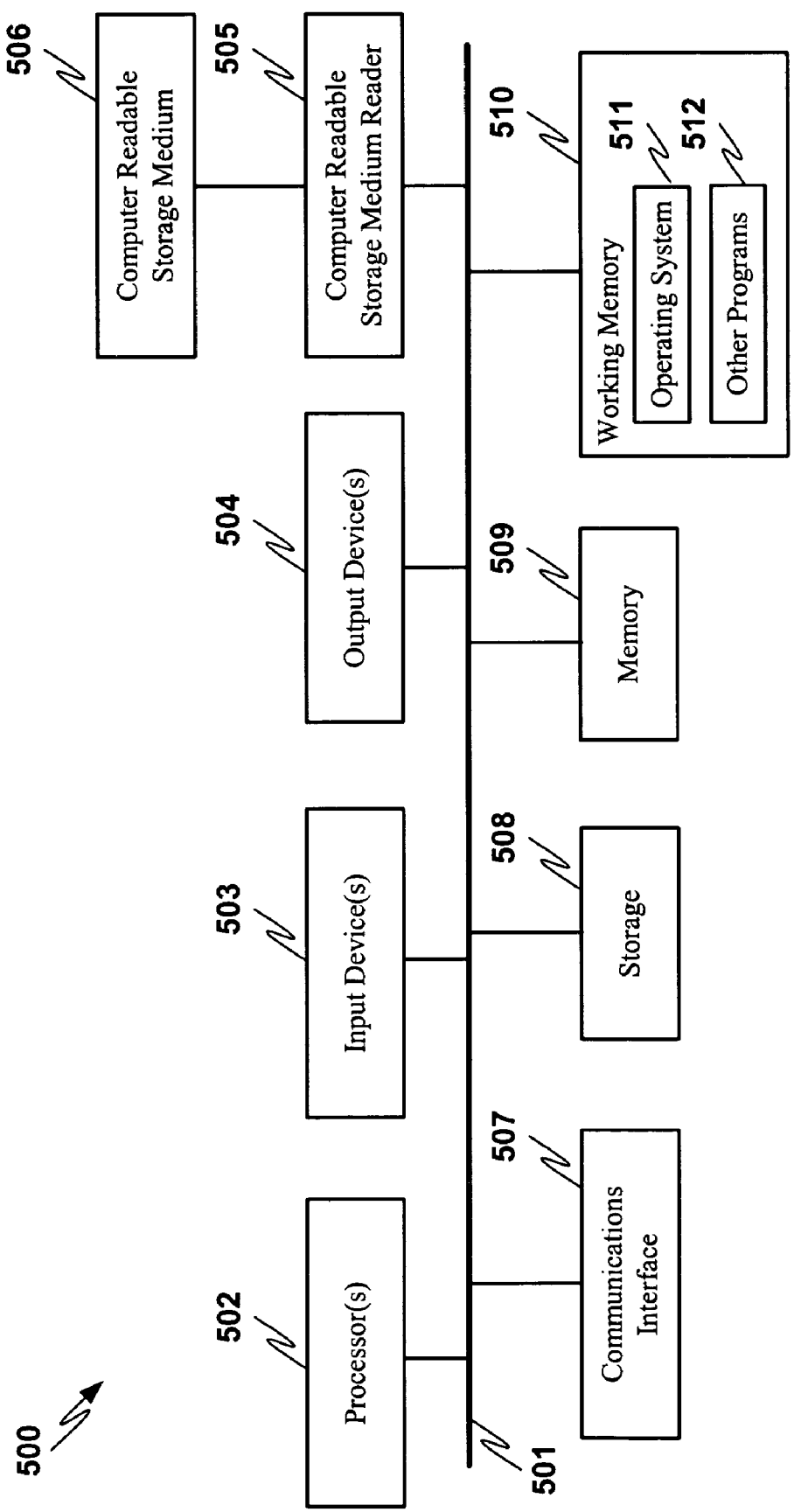
FIG. 5 is a hardware block diagram of an example computer system, which may be used to embody one or more components in an embodiment.

FIG. 5 illustrates an example processing system 500, which can comprise one or more of the elements of FIG. 1. Turning now to FIG. 5, an example computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 500 comprises components coupled via one or more communication channels (e.g., bus 501) including one or more general or special purpose processors 502, such as a Pentium®, Centrino®, Power PC®, digital signal processor ("DSP"), and so on. System 500 components also include one or more input devices 503 (such as a mouse, keyboard, microphone, pen, and so on), and one or more output devices 504, such as a suitable display, speakers, actuators, and so on, in accordance with a particular application. (It will be appreciated that input or output devices can also similarly include more specialized devices or hardware/software device enhancements suitable for use by the mentally or physically challenged.)

System 500 also includes a machine readable storage media reader 505 coupled to a machine readable storage medium 506, such as a storage/memory device or hard or removable storage/memory media; such devices or media are further indicated separately as storage 508 and memory 509, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 507 may also be included, such as a modem, DSL, infrared, RF or other suitable transceiver, and so on for providing inter-device communication directly or via one or more suitable private or public networks or other components that may include but are not limited to those already discussed.

Working memory 510 further includes operating system ("OS") 511 elements and other programs 512, such as one or more of application programs, mobile code, data, and so on for implementing system 500 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 512 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 508 or memory 509) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed:

1. A method for managing a profile within a web portal environment, the method comprising:
   receiving a selection of at least one profile field and a selection of at least one data field, wherein data is stored in the at least one data field at one or more data sources;
   associating the at least one profile field with the at least one data field such that data from the at least one data field is utilized for the at least one profile field;
   wherein updates of data in the at least one data field are dynamically propagated to the associated at least one profile field; and
   wherein the associating step is done using at least one processor.

2. The method of claim 1, wherein the at least one data source comprises one of:
   a relational database, a file system, a class, a bean, a Lightweight Directory Access Protocol (LDAP) server and a network accessible source.

3. The method of claim 1, wherein receiving a selection of the at least one profile field and the at least one data field further comprises:
   accepting username and password information for the at least one profile field.

4. The method of claim 1, wherein associating the at least one profile field with the at least one data field such that data provided by the data source associated with the at least one data field is utilized for the at least one profile field farther comprises:
   mapping information from disparate data sources into a single user profile.

5. The method of claim 1, wherein the at least one profile field comprises user permission fields.

6. The method of claim 1, wherein the at least one profile field comprises user identification fields.

7. The method of claim 1, further comprising:
   storing an association produced by associating the at least one profile field with the at least one data field such that data from the at least one data field is utilized for the at least one profile field.

8. The method of claim 1, wherein the profile is a user profile for a web portal.

9. The method of claim 8, thereby enabling a user to be authenticated with a plurality of applications that share trusted relationship, wherein each of the plurality of applications has access to the user profile, without the need for the user to re-authenticate with each application.

10. A machine readable storage medium comprising instructions for managing a profile, which instructions, when executed by a processor cause a system to carry out the following steps:
    receiving a selection of at least one profile field and a selection of at least one data field, wherein data is stored in the at least one data field at one or more data sources;
    associating the at least one profile field with the at least one data field such that data from the at least one data field is utilized for the at least one profile field; and
    wherein updates of data in the at least one data field are dynamically propagated to the associated at least one profile field.

11. The machine readable storage medium of claim 10, wherein the at least one data source comprises at least one of: a relational database, a file system, a class, a bean, a Lightweight Directory Access Protocol (LDAP) server and a network accessible source.

12. The machine readable storage medium of claim 10, wherein the instructions for receiving a selection of the at least one profile field and the at least one data field comprises instructions for carrying out the step of:
    accepting username and password information for the at least one profile field.

13. The machine readable storage medium of claim 10, wherein the instructions for associating the at least one profile field with the at least one data field such that data provided by the data source associated with the at least one data field is utilized for the at least one profile field comprise instructions for carrying out the step of:
    mapping information from disparate data sources into a single user profile.

14. The machine readable storage medium of claim 10, wherein the one or more profile fields comprise user permission fields.

15. The machine readable storage medium of claim 10, wherein the at least one profile field comprises user identification fields.

16. The machine readable storage medium of claim 10, further comprising instructions for carrying out the step of:
    storing an association produced by associating the at least one profile field with the at least one data field such that data from the at least one data field is utilized for the at least one profile field.

17. The machine readable storage medium of claim 10, wherein the profile is a user profile for a web portal.

18. The machine readable storage medium of claim 17, thereby enabling an user to be authenticated with a plurality of applications that share trusted relationship, wherein each of the plurality of applications has access to the user profile, without the need for the user to re-authenticate with each application.

19. A system for managing a user profile within a web portal environment, the system comprising:
    a processor; and
    one or more stored sequences of instructions which, when executed by the processor, cause the processor to carry out the steps of:
    receiving a selection of at least one profile field and a selection of at least one data field, wherein data is stored in the one or more data fields at one or more data sources;
    associating the at least one profile field with the at least one data field such that data from at least one data field is utilized for the at least one profile field; and
    wherein updates of data in the at least one data field are dynamically propagated to the associated at least one profile field.

20. A method for managing a profile within a web portal environment, the method comprising:
    accepting a designation of one or more data providers, each data provider associated with one or more provider data fields;
    displaying a list of one or more user profile fields for a user profile and the one or more provider data fields;
    in response to a selection of a first field from the one or more user profile fields and a second field from the one or more provider data fields, associating the first field and the second field such that information associated with the second field is utilized for the first field;
    wherein updates of data in the second field from the one or more provider data fields is dynamically propagated to the first field from the one or more profile fields; and wherein the associating step is done using at least one processor.

21. A machine readable storage medium comprising instructions for managing a profile, which instructions, when executed by a processor cause a system to carry out the following steps:

associating a first profile field with a first data field such that data from the first data field is used for the first profile field, the first data field being in a first data source;

associating a second profile field with a second data field such that data from the second data field is used for the second profile field, the second data field being in a second data source;

wherein updates of data in the first and second data field are dynamically propagated to the first and second profile field respectively; and wherein information from both the first and second data sources are mapped into a single user profile.

22. The machine readable storage medium of claim 21, wherein the first and second data sources are disparate data sources.

23. The machine readable storage medium of claim 21, wherein each of the first and second data sources are a distinct type of the following data source types:

a relational database, a file system, a class, a bean, a Lightweight Directory Access Protocol (LDAP) server and a network accessible source.

* * * * *

UNITED STATES PATENT AND TRADEMARK OFFICE
CERTIFICATE OF CORRECTION

PATENT NO. : 7,620,977 B2
APPLICATION NO. : 11/133571
DATED : November 17, 2009
INVENTOR(S) : Timothy Breeden et al.

It is certified that error appears in the above-identified patent and that said Letters Patent is hereby corrected as shown below:

In column 4, line 51, delete "extensible" and insert -- eXtensible --, therefor.

In column 7, line 32, in claim 4, delete "farther" and insert -- further --, therefor.

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,620,977 B2 | Page 1 of 1 |
| APPLICATION NO. | : 11/133571 | |
| DATED | : November 17, 2009 | |
| INVENTOR(S) | : Breeden et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this

Fifth Day of October, 2010

David J. Kappos
*Director of the United States Patent and Trademark Office*